United States Patent
Qian et al.

(10) Patent No.: US 8,107,381 B2
(45) Date of Patent: Jan. 31, 2012

(54) METHOD OF PERFORMING ETHERNET GATEWAY SWITCH TROUBLE DIAGNOSTICS

(75) Inventors: Zhiqiang Qian, Holmdel, NJ (US); Paritosh Bajpay, Edison, NJ (US); Anamaria Csupor, Keyport, NJ (US); Jackson Liu, Middletown, NJ (US); Carlos Morales, Lakewood, NJ (US); Michael Zinnikas, North Brunswick, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 841 days.

(21) Appl. No.: 11/945,751

(22) Filed: Nov. 27, 2007

(65) Prior Publication Data

US 2009/0138588 A1    May 28, 2009

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)

(52) U.S. Cl. ......... 370/242; 370/250; 370/400; 709/224

(58) Field of Classification Search .................. 370/241, 370/242, 244, 250, 395.53, 400, 401; 709/224, 709/225

See application file for complete search history.

(56) References Cited

U.S. PATENT DOCUMENTS

| | | |
|---|---|---|
| 5,159,685 A | 10/1992 | Kung |
| 5,661,668 A | 8/1997 | Yemini et al. |
| 6,252,888 B1 | 6/2001 | Fite, Jr. et al. |
| 6,298,308 B1 | 10/2001 | Reid et al. |
| 6,463,588 B1 * | 10/2002 | Jenkins et al. ............... 725/127 |
| 6,532,215 B1 | 3/2003 | Muntz |
| 6,636,484 B1 * | 10/2003 | Agrawal et al. ............... 370/248 |
| 6,654,914 B1 | 11/2003 | Kaffine et al. |
| 6,657,969 B1 | 12/2003 | Neuendorff et al. |
| 6,883,119 B1 | 4/2005 | Bette et al. |
| 7,085,224 B1 | 8/2006 | Oran |
| 7,120,633 B1 | 10/2006 | Kromer |
| 7,225,139 B1 | 5/2007 | Tidwell et al. |
| 7,447,147 B2 * | 11/2008 | Nguyen et al. ............... 370/216 |
| 2003/0081620 A1 * | 5/2003 | Danner et al. ............... 370/400 |
| 2004/0160895 A1 | 8/2004 | Holmgren et al. |
| 2005/0175004 A1 * | 8/2005 | Russell et al. ............... 370/389 |
| 2007/0127506 A1 * | 6/2007 | Absillis ....................... 370/401 |
| 2008/0159154 A1 * | 7/2008 | Bajpay et al. ............... 370/245 |

* cited by examiner

*Primary Examiner* — Xavier Szewai Wong
(74) *Attorney, Agent, or Firm* — Hoffmann & Baron, LLP

(57) ABSTRACT

A service provider unit automatically diagnoses problems in an Ethernet network that are associated with layers 1, 2, and/or 3 and determines whether there is a problem associated with an Ethernet gateway switch EGS. Further diagnostics can be performed to determine the layer, type, and/or location of the problem(s) based on whether there is a problem with the EGS. The diagnostic process followed depends on the types of problem(s) in the network. Once the problems have been diagnosed, an operator can be notified of the location and/or type of problem.

14 Claims, 6 Drawing Sheets

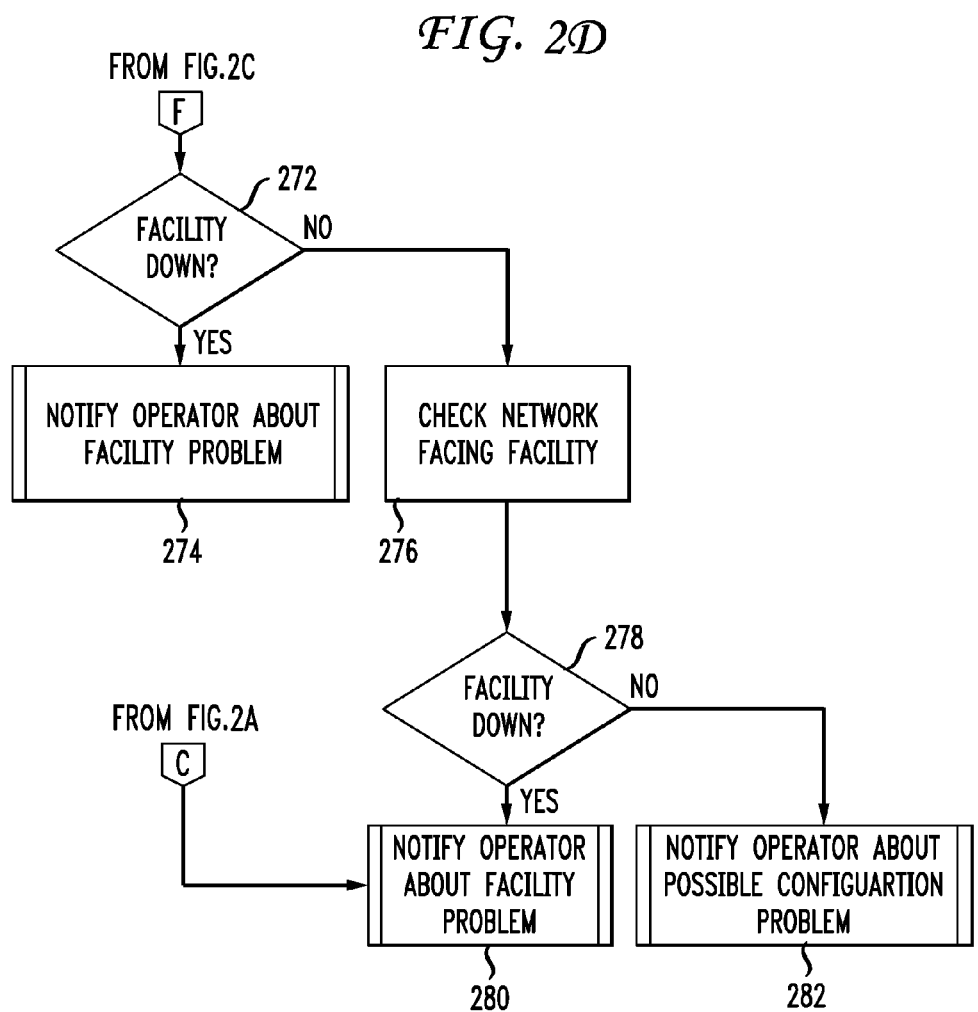

METHOD OF PERFORMING ETHERNET GATEWAY SWITCH TROUBLE DIAGNOSTICS

BACKGROUND OF THE INVENTION

1. Field of the Invention

The present invention relates to performing automated diagnostics of a network, and specifically, to performing automated diagnostic of an Ethernet network.

2. Brief Description of the Related Art

Ethernet networks can be controlled by switches that cross connect clients, servers, and network devices. The Ethernet network can be represented using the well know Transmission Control Protocol/Internet Protocol (TCP/IP) model (or the Open System Interconnection (OSI) model) and can include a physical layer (layer 1), a data link layer (layer 2), and a network layer (layer 3). The physical layer represents the physical equipment of the network, such as a (Synchronous Optical Network (SONET) ring and/or twisted pair cables. The data link layer defines Ethernet packets and routing schemes for efficiently routing the Ethernet packets from one IP address to another. The network layer provides flow control and connection protocols.

Ethernet network failures can occur in layer 1, layer 2, and/or layer 3. Typically, layer 1 failures can be detected and diagnosed automatically to allow a service provider to resolve the failure quickly. However, automatic detection and diagnostics for layer 2 and 3 are not generally performed for conventional Ethernet networks. Typically, such diagnostics are performed manually. Such manual diagnostics can result in long down-times for customers who wish to use the Ethernet network. In addition, manual diagnostics can be labor intensive and can be an inefficient use of a workforce.

Therefore automatic diagnostics for layer 2 and layer 3 failures in an Ethernet network would be desirable.

SUMMARY OF THE INVENTION

Preferred embodiments of the present invention diagnose computer network problems associated with layer 1-3. The preferred embodiments can perform tests to determine the layer, type, and/or location of the problem(s). The process followed depends on the types of problem(s) in the network, which is determined using a sectionalized approach.

In one embodiment an automated method of diagnosing a computer network problem is disclosed. The method includes determining whether there is an alarm associated with an Ethernet gateway switch (EGS). The EGS is coupled between a provider edge (PE) router and a third party service provider network. The method also includes identifying whether a problem associated with at least one of a port of the EGS and a port of the PE router has occurred based on the determination of whether there is an alarm associated with the EGS.

In another embodiment, a non-transitory computer-readable medium that includes instructions which are executable by a computing device for diagnosing problems in a computer network is disclosed. The instructions diagnose problems in a computer network by determining whether there is an alarm associated with an Ethernet gateway switch (EGS). The EGS is coupled between a provider edge (PE) router and a third party service provider network. The instructions further diagnose problems in a computer network by identifying whether a problem associated with at least one of a port of the EGS and a port of the PE router has occurred based on the determination of whether there is an alarm associated with the EGS.

In yet another embodiment, a system for diagnosing problems in a network is disclosed. The system includes an Ethernet network and a service provide unit. The Ethernet network includes a Ethernet gateway switch (EGS) coupled between a service provider edge router and a third party service provider. The service provider unit communicates with the Ethernet network to determine whether there is an alarm associated with an the EGS and identify whether a problem associated with at least one of a port of the EGS and a port of the provider edge router has occurred in response to the determination of whether there is an alarm associated with the EGS.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIGS. 2A-D show a flow diagram illustrating a preferred embodiment of the diagnostics performed in the Ethernet network.

DETAILED DESCRIPTION OF THE PREFERRED EMBODIMENTS

Preferred embodiments of the present invention are directed to automatically diagnosing problems in an Ethernet network that are associated with layers 1, 2, and/or 3. Such problems can include, but are not limited to equipment failures, logic errors, configuration errors, network delays, network congestion, data loss, and the like. The Ethernet network includes an Ethernet gateway switch (EGS) located between the service provider's edge router(s) and third party Ethernet service providers (ESPs). The EGS is gateway switch that facilitates communication between the third party ESPs and the service provider. The third party ESPs provide an intermediary network that enable customers to access the service provider's network.

Preferred embodiments can determine whether there is an alarm associated with an Ethernet gateway switch. If there is an alarm, the preferred embodiments can perform further tests to determine the layer, type, and/or location of the problem(s) causing the alarm. For example, preferred embodiments can determine whether a problem has occurred that is associated with at least one port of the Ethernet gateway switch (layer 2), a port of the provider edge router (layer 2), and logical channels of a virtual local area network (VLAN) (layer 3) when the alarm occurs. The process followed depends on the types of problem(s) in the network, which is determined using a sectionalized approach performed by a diagnostic engine. Once the problems have been diagnosed, the preferred embodiment can notify the appropriate operator of the location and/or type of problem. The operator can then resolve the problem based on the diagnosis.

The preferred embodiments enable service providers to detect and diagnose problems quickly to eliminate or reduce the network downtime experienced by a customer when a problem occurs. In some cases, the preferred embodiments may detect, diagnose, and resolve the problem before the customer becomes aware of the problem. In addition, the preferred embodiments can reduce the time and labor required of an operator to find, diagnose, and resolve the problem. This allows the service provider to provide a high quality of service, while reducing costs associated with network maintenance.

Figure 1:
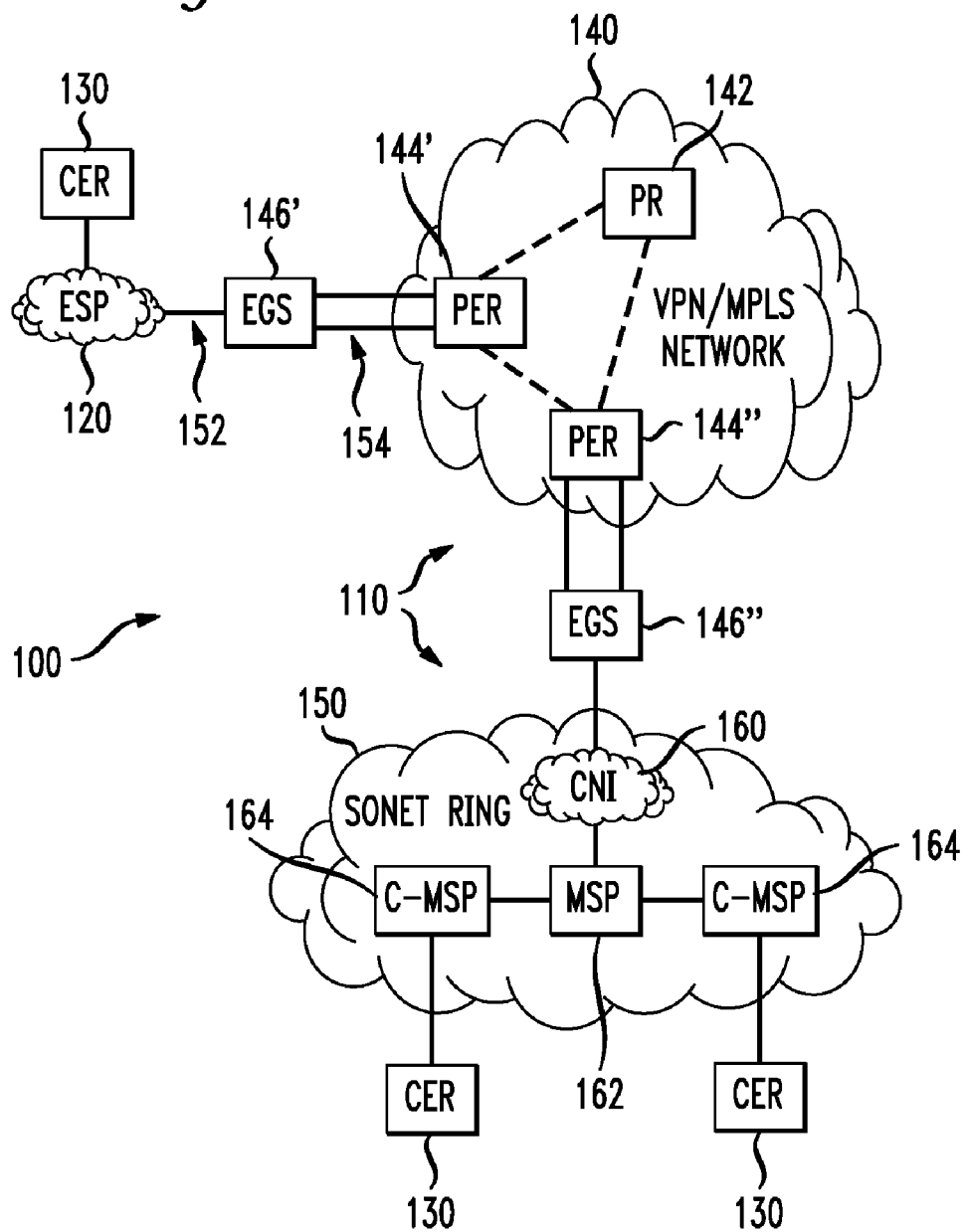
FIG. 1 shows an exemplary Ethernet network architecture in accordance with preferred embodiments of the present invention.

FIG. 1 depicts an exemplary Ethernet network architecture 100 (hereinafter "network 100") in accordance with the preferred embodiments of the present invention. The network 100 preferably includes a service provider network 110, a third-party Ethernet service provider (hereinafter "ESP 120"), and customer edge routers (CER) 130. The service provider network 110 includes a virtual private network/multi-protocol label switching (VPN/MPLS) network 140 and a SONET or Token ring network 150.

The VPN/MPLS network 140 preferably provides customers a VPN service for IP traffic. The VPN/MPLS network 140 preferably includes provider routers (PR) 142, provider edge routers (PER) 144 (144' and 144"), and Ethernet gateway switches (EGSs) 146 (146' and 146"). The provider edge routers are routers that facilitate routing of information in the service provider network. Customers preferably connect to the service provider network 110 with their CERs 130 via ESP 120. The EGS 146' connects the ESP 120 to the service provider network 110 and the PER 144' via facilities, such as 10 GB Ethernet lines. The EGS 146' preferably includes customer facing facilities 152 that connect the EGS 146' to the ESP 120 and network facing facilities 154 that connect the EGS 146' to the provider edge router 144'. The provider edge routers 144' connect to the provider edge router 144" as well as the provider router 142 to facilitate communication in the network 100. The provider edge router 144" connects to the EGS 146", which connects to the SONET ring network 150. The SONET ring network 150 provides the Ethernet backbone and can facilitate long haul communications and preferably includes a SONET monitoring unit (SMU) 160, a multi-server platform (MSP) 162 that connects layer1 and layer2 switches to serve as a testing point that the service provider can loop to the MSP to locate the problem, and customer MSPs (C-MSPs) 164 that facilitate communication between the SONET ring 150 and the CERs 130 and provide testing point. If a C-MSP has a problem, there is a problem to be resolved by a customer.

FIGS. 2A-D is a flow chart illustrating the operation of the diagnostic engine in accordance with the preferred embodiments of the present invention. The service provider network 110 can be monitored by a diagnostic engine that can perform layer 1, 2, and 3 problem detection and diagnostics. The diagnostic engine can be implemented as one or more applications by one or more computing devices, which are communicatively coupled to the service provider network 110. The diagnostic engine implements a sectionalized approach to isolate a problem in the network 100 to a particular layer, type, and/or location.

Figure 2A:
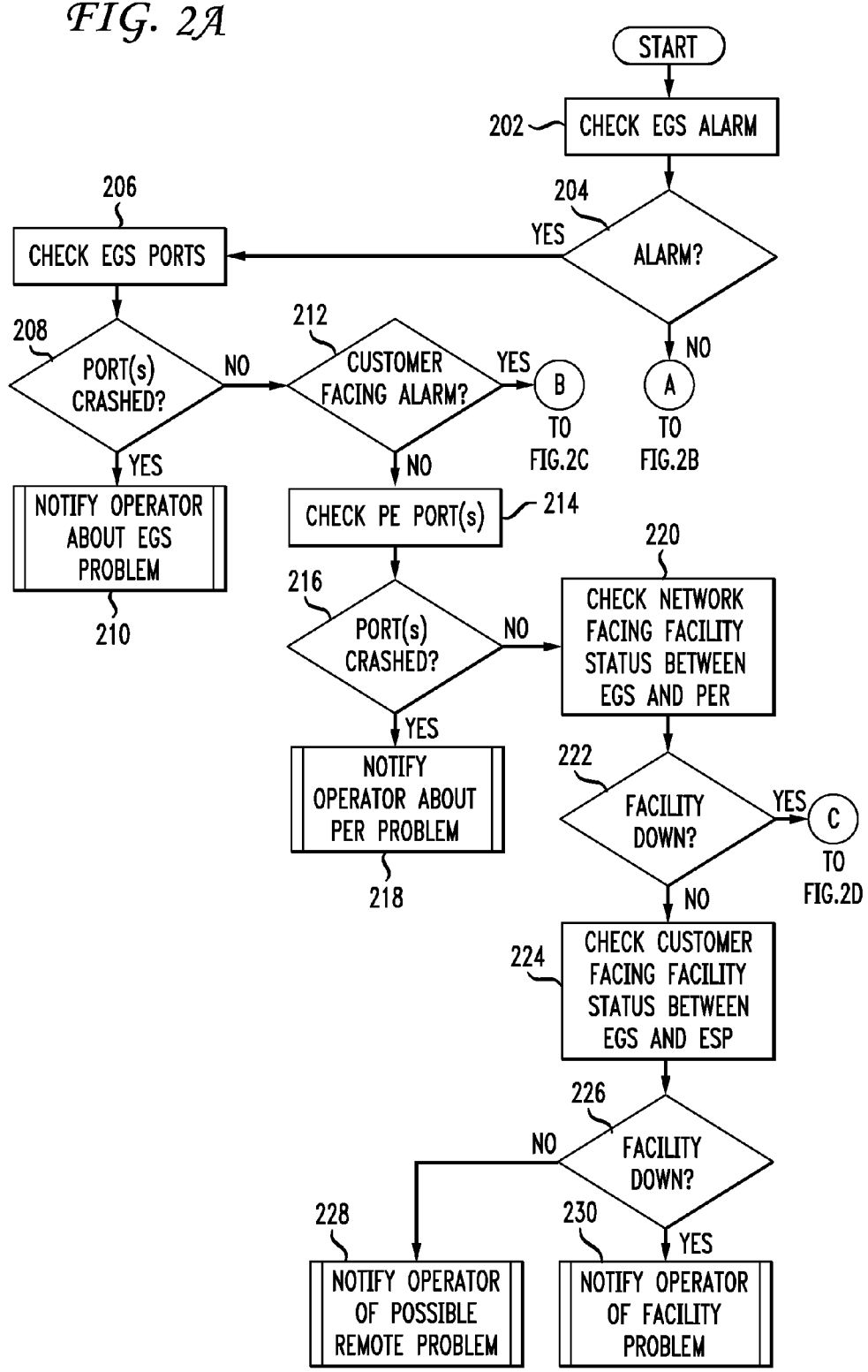
Figure 2B:
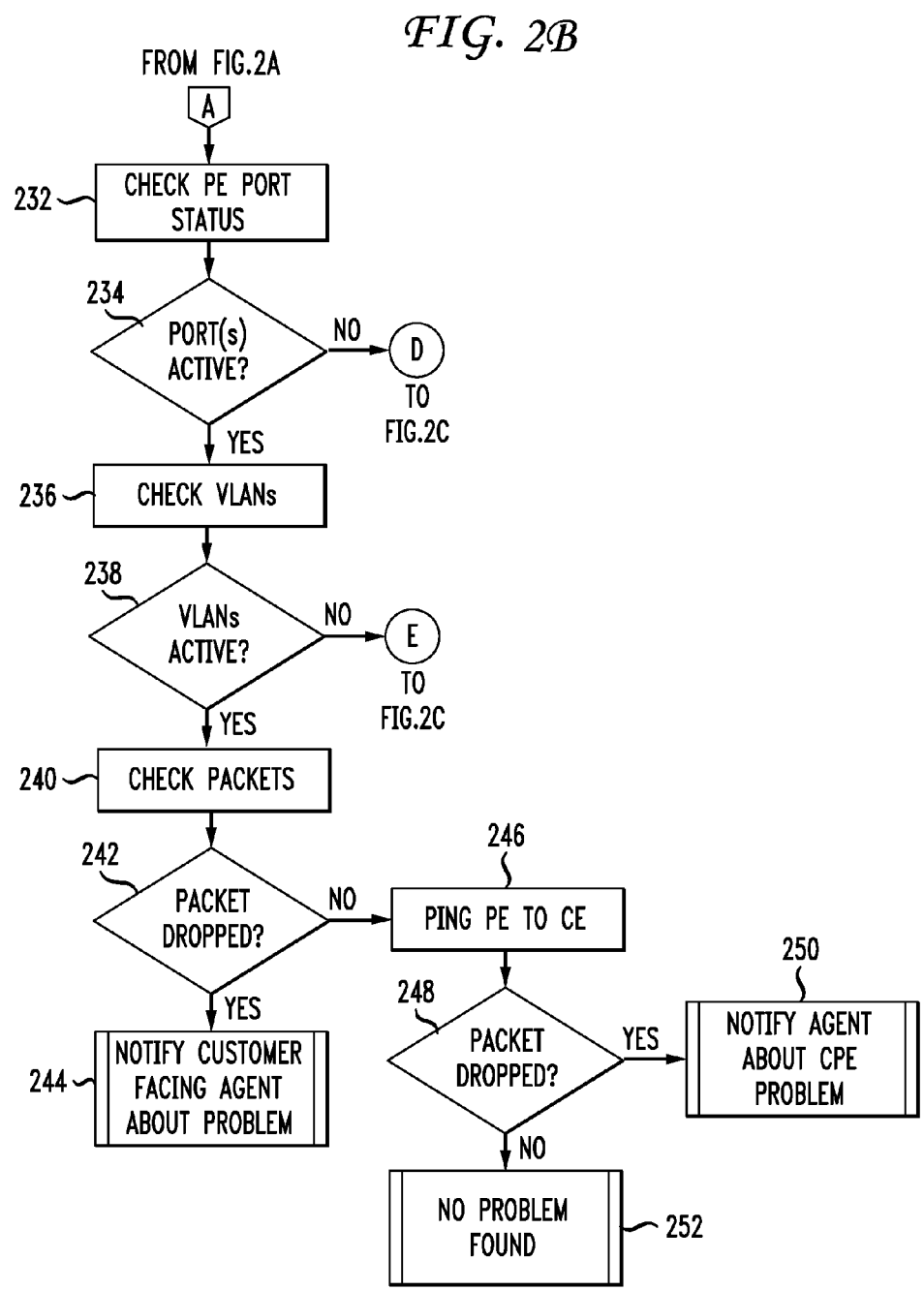

Referring to FIGS. 2A-D, the diagnostic engine preferably checks the EGS 146' for an alarm (step 202). An alarm is an indication of a possible problem. A problem can include, but is not limited to an equipment failure, configuration error, network delay, network congestion, data loss, and the like. If the diagnostic engine does not detect an alarm (step 204), the process continues at step 234 (FIG. 2B). If the diagnostic engine detects an alarm (step 204), the diagnostic engine checks the physical ports (layer 2) of the EGS 146' for failures (step 206). To check the physical ports of the EGS 146', the diagnostic engine can use commands known to those skilled in the art, such as a show summary command. If one or more of the ports of the EGS 146' have crashed (step 208), the diagnostic engine notifies an operator about a problem with the EGS 146' and the operator can resolve the problem by replacing the ports that crashed (step 210). Otherwise, the diagnostic engine determines if the EGS alarm is customer facing (layer 1) on the EGS 146' (i.e. between the EGS 146' and the ESP 130 (step 212).

Figure 2C:
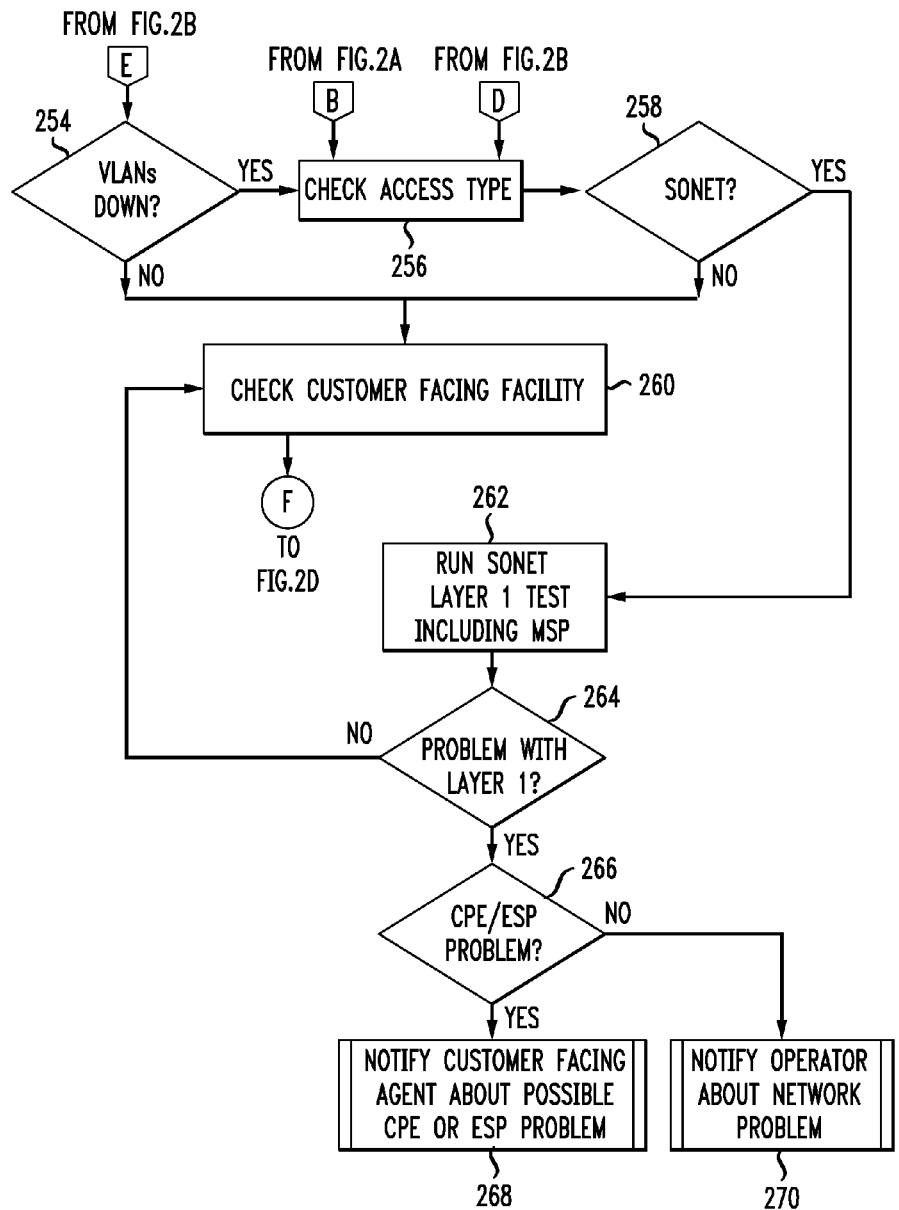

If there is a customer facing alarm (step 212), the process preferably skips to step 256 (FIG. 2C). If, however, the alarm is not customer facing (step 212), the diagnostic engine checks the physical ports (layer 2) of the PER 144' using a command, such as the show context summary (step 214). If the diagnostic engine determines that one or more of the ports crashed (step 216), the diagnostic engine notifies the operator about a problem with the ports of PER 144' and the operator can resolve the problem by replacing the ports (step 218). Otherwise, the diagnostic engine continues to diagnose the problem by checking the network facing facility status (layer 1) between the EGS 146' and the PE 144' (step 220). If the network facing facility is down (step 222), the diagnostic engine notifies the operator about a problem with the facility (step 280) (FIG. 2D). Otherwise, the diagnostic engine checks the customer facing facility (layer 1) between the EGS 146' and the ESP 130 (step 224). If there is no problem with the customer facing facility (step 226), the diagnostic engine notifies the operator of a possible remote problem (step 228). If, however, there is a problem with the customer facing facility (step 226), the diagnostic engine notifies the operator of a facility problem (step 230).

Returning to the case where the diagnostic engine does not detect an EGS alarm (step 204) (FIG. 2A), the diagnostic engine continues by checking the physical port status (layer 2) of the PER 144' using a command know to those skilled in the art, such as the show interface command (step 232). If one or more of the ports are not active (step 234), the process proceeds to step 256, where the diagnostic engine determines the access technology, such as SONET, that is accessible by the customer. If the ports are active (step 234), the diagnostic engine checks the functionality of layer 3 by checking the logical channels of the VLANs of the EGS 146' using a command known to those skilled in the art, such as the show VLAN brief command (step 236).

If the VLANs are not active (step 238), the process proceeds to step 254 (FIG. 2C). If the VLANs are active (step 238), the diagnostic engine checks whether any data packets were dropped by the EGS 146' using a command known to those skilled in the art, such as the show VLAN access-log command (step 240). If the diagnostic engine determines that there are dropped data packets (step 242), the diagnostic engine notifies the customer facing agent about the problem. If there are no dropped packets (step 242), the diagnostic engine pings from the PER 144' to the CER 130 by sending a message to the CER 130 and requesting a response to determine if an packets have been dropped (step 246). If there are dropped packets (step 248), the diagnostic engine notifies the agent about a customer equipment problem (step 250). Otherwise, the diagnostic engine determines no problem exists and the diagnostic engine closes a trouble ticket associated with the diagnostic procedure (step 252).

For the case where the diagnostic engine determines that the VLANs are not active (step 238) (FIG. 2B), the diagnostic engine determines if the VLANs are down (step 254). If the VLANs are not down (step 254), the process continues by checking the customer facing facility (layer 1) between the EGS 146' and the ESP 120 (step 260). If one or more of the VLANs are down (step 254), the diagnostic engine checks access technology used by the customer. If the access type is not SONET (step 258), the diagnostic engine skips layer 1 testing and checks the customer facing facility (step 260). If, however, the diagnostic engine determines that the access type is SONET (step 258), the diagnostic engine runs a SONET layer 1 test that includes a multi-server platform (MSP) (step 262). If there is no problem with detected by the layer 1 test (step 264), the diagnostic engine proceed by checking the customer facing facility between the EGS 146' and the ESP 120 (step 260). However, if a problem with layer 1 is detected by the test, the diagnostic engine determines if the problem relates to a customer equipment problem (CEP) or ESP problem (step 266). For CEP or ESP related problems, the diagnostic engine notifies the customer facing agent about a possible problem (step 268) and when the problem is not related to a CEP or ESP problem, the diagnostic engine notifies the operator about a network problem.

When the diagnostic engine checks the customer facing facility between the EGS 146' and the ESP 120 (step 260) shown in FIG. 2C, the diagnostic engine determines if the facility is down (step 272). When the facility is down, the diagnostic engine notifies the operator about the facility problem (step 274). Otherwise, the diagnostic engine checks the network facing facility between the PER 144' and the EGS 146' (step 276). If the facility is down (step 278), the diagnostic engine notifies the operator about the facility problem (280). If, however, the facility is not down (step 278), the diagnostic engine notifies the operator about a possible configuration problem (step 282).

Figure 3:
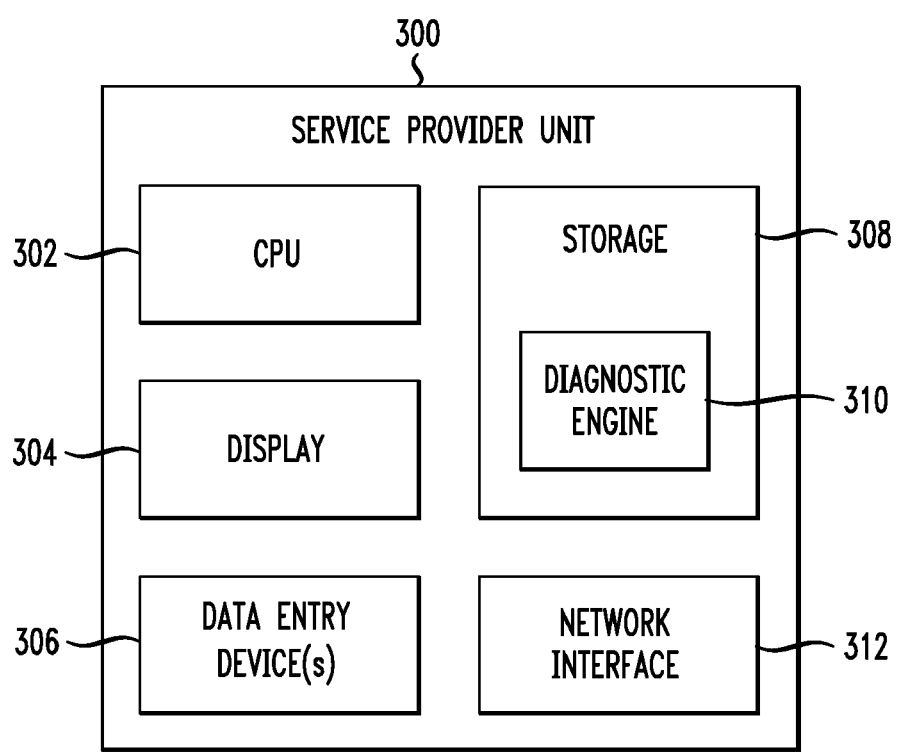
FIG. 3 shows a block diagram of a computing device for implementing the automated diagnostics of the Ethernet network.

FIG. 3 depicts an exemplary computing device 300 for implementing the test and diagnostics of the Ethernet network using the diagnostic engine. The computing device 300 can be a mainframe, personal computer (PC), laptop computer, workstation, handheld device, such as a PDA, or the like. In the illustrated embodiment, the computing device 300 includes a central processing unit (CPU) 302 and preferably a display device 304. The display device 304 enables the computing device 300 to communicate directly with an operator through a visual display. The computing device 300 can further include data entry device(s) 306, such as a keyboard, touch screen, and/or mouse. The computing device 300 can include storage 308 for storing data and instructions. The storage 308 can include such technologies as a floppy drive, hard drive, tape drive, Flash drive, optical drive, read only memory (ROM), random access memory (RAM), and the like.

Applications, such as the diagnostic engine 310 for detecting and diagnosing problems in the network 100 as described above, can be resident in the storage 308. The diagnostic engine 310 can include instructions for implementing those embodiments depicted in FIGS. 2A-D. The storage 308 can be local or remote to the computing device 300. The computing device 300 includes a network interface 312 for communicating with the network 100. The CPU 302 operates to run the application in storage 308 by performing instructions therein and storing data resulting from the performed instructions, which may be presented to an operator via the display 304 or by other mechanisms known to those skilled in the art, such a print out from a printer. The data can include a type, location, cause, etc. of the problem in the network 100 so that the operator can quickly identify and resolve the problem.

The diagnostic engine enables service providers to detect and diagnose layer 2 and layer 3 problems in a network automatically. This proactive approach enables the service provider to react quickly to network problems to minimize the duration for which customers are affected by the problem. The diagnostic engine can facilitate detecting, diagnosing, and resolving a problem in an Ethernet network before the customer becomes aware of the problem. Time and labor required of an operator to find, diagnose, and resolve the problem can be greatly reduce by the operation of the diagnostic engine. This allows the service provider to provide a high quality of service, while reducing costs associated with network maintenance.

While preferred embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. An automated method of diagnosing a computer network problem comprising:
   determining whether an alarm is associated with an Ethernet gateway switch coupled between a provider edge router and a third party service provider network;
   identifying whether a problem associated with a port of the Ethernet gateway switch has occurred in response to determining the alarm is associated with the Ethernet gateway switch;
   determining a physical port status of the port of the provider edge router in response to an absence of an alarm associated with the Ethernet gateway switch;
   identifying whether there is a customer facing alarm between the Ethernet gateway switch and the third party service provider in response to determining no problem is associated with the port of the Ethernet gateway switch and the alarm is associated with the Ethernet gateway switch; and
   determining an access technology associated with the customer in response to identifying that there is a customer facing alarm between the Ethernet gateway switch and the third party service provider.

2. The method of claim 1, further comprising identifying whether a problem associated with a virtual local area network of the Ethernet gateway switch has occurred in response to the physical port status of the port of the provider edge router being identified as operating properly.

3. The method of claim 1, further comprising performing a layer 1 test in response to the access technology being a Synchronous Optical Network.

4. The method of claim 3, further comprising checking a network facing facility between the Ethernet gateway switch and the provider edge router for a problem.

5. The method of claim 4, further comprising checking a customer facing facility between the Ethernet gateway switch and the third party service provider network in response to there being no problem detected associated with the network facing facility.

6. A non-transitory computer-readable medium comprising instructions executable by a computing device that diagnoses problems in a computer network by:
   determining whether an alarm is associated with an Ethernet gateway switch coupled between a provider edge router and a third party service provider network;
   identifying whether a problem associated with a port of the Ethernet gateway switch has occurred in response to determining the alarm is associated with the Ethernet gateway switch;

determining a physical port status of the port of the provider edge router in response to an absence of an alarm associated with the Ethernet gateway switch;

identifying whether there is a customer facing alarm between the Ethernet gateway switch and the third party service provider in response to determining no problem is associated with the port of the Ethernet gateway switch and the alarm is associated with the Ethernet gateway switch; and determining an access technology associated with the customer in response to identifying that there is a customer facing alarm between the Ethernet gateway switch and the third party service provider.

7. The non-transitory computer-readable medium of claim 6, further comprising instructions executable by a computing device that diagnoses problems in a computer network by identifying whether a problem associated with a virtual local area network of the Ethernet gateway switch has occurred in response to the physical port status of the port of the provider edge router being identified as operating properly.

8. The non-transitory computer-readable medium of claim 6, further comprising instructions executable by a computing device that diagnoses problems in a computer network by performing a layer 1 test in response to the access technology being Synchronous Optical Network.

9. The non-transitory computer-readable medium of claim 8, further comprising instructions executable by a computing device that diagnoses problems in a computer network by checking a network facing facility between the Ethernet gateway switch and the provider edge router for a problem.

10. The non-transitory computer-readable medium of claim 9, further comprising instructions executable by a computing device that diagnoses problems in a computer network by checking a customer facing facility between the Ethernet gateway switch and the third party service provider network in response to there being no problem detected associated with the network facing facility.

11. A system configured to diagnose network problems comprising:

an Ethernet gateway switch coupled between a service provider edge router and a third party service provider of a network; and a service provider unit operatively coupled to the network, the service provider unit configured to:

determine whether an alarm is associated with the Ethernet gateway switch;

identify whether a problem associated with a port of the Ethernet gateway switch has occurred in response to determining the alarm is associated with the Ethernet gateway switch;

determine a physical port status of the port of the provider edge router in response to an absence of an alarm associated with the Ethernet gateway switch;

identify whether there is a customer facing alarm between the Ethernet gateway switch and the third party service provider in response to determining no problem is associated with the port of the Ethernet gateway switch and the alarm is associated with the Ethernet gateway switch, and determining an access technology associated with the customer in response to identifying that there is a customer facing alarm between the Ethernet gateway switch and the third party service provider.

12. The system of claim 11, wherein the service provider unit determines whether a problem associated with a virtual local area network of the Ethernet gateway switch has occurred in response to the physical port status of the port of the provider edge router being identified as operating properly.

13. The system of claim 12, wherein the service provider unit performs a layer 1 test in response to the access technology being Synchronous Optical Network.

14. The system of claim 13, wherein the service provider unit checks a network facing facility between the Ethernet gateway switch and the provider edge router for a problem.

* * * * *